United States Patent [19]

Gaiser

[11] 4,084,377
[45] Apr. 18, 1978

[54] BRAKE SYSTEM FAILURE CONDITION INDICATOR

[75] Inventor: Robert F. Gaiser, Stevensville, Mich.

[73] Assignee: The Bendix Corporation, South Bend, Ind.

[21] Appl. No.: 739,240

[22] Filed: Nov. 5, 1976

[51] Int. Cl.² .......................................... B60T 11/20
[52] U.S. Cl. ..................................... 60/535; 60/545; 60/562; 60/588; 60/592; 340/52 C
[58] Field of Search ............... 60/534, 535, 592, 562, 60/588, 545; 340/52 C

[56] References Cited

U.S. PATENT DOCUMENTS

| 2,473,282 | 6/1949 | Hebel | 60/592 |
| 3,480,333 | 11/1969 | Stelzer | 60/534 |
| 3,672,732 | 6/1972 | Green | 60/534 |
| 3,792,433 | 2/1974 | Wada | 60/534 |
| 3,852,962 | 12/1974 | Warwick | 60/535 |
| 3,879,947 | 4/1975 | Gaiser | 60/535 |
| 3,969,898 | 7/1976 | Fulmer | 60/592 |
| 4,024,712 | 5/1977 | Takeuchi | 60/535 |

FOREIGN PATENT DOCUMENTS 2,271,090   12/1975   Italy ..................................... 60/534

*Primary Examiner*—Martin P. Schwadron
*Assistant Examiner*—Abraham Hershkovitz
*Attorney, Agent, or Firm*—Leo H. McCormick, Jr.; Ken C. Decker

[57] ABSTRACT

A master cylinder having an indicator activated by either a low level fluid condition in a reservoir or any operational pressure imbalance between first and second fluid distribution systems of a master cylinder to inform an operator of an adverse condition which could affect braking.

5 Claims, 5 Drawing Figures

BRAKE SYSTEM FAILURE CONDITION INDICATOR

BACKGROUND OF THE INVENTION

This invention relates to a master cylinder having an indicator responsive to both a fluid level signal and differential pressure signal for informing an operator of a fluid condition in a brake system.

The U.S. Department of Transportation has proposed highway safety standards which require that the operator of a vehicle be informed of any adverse condition in a braking system which may affect braking.

Initially it was thought that a fluid level indicator, located in the reservoir of a master cylinder would be sufficient to meet the proposed safety standards. However upon reflection, it was determined that a failure in a brake supply line could occur and place an operator in a dangerous situation which would not be indicated until a low fluid condition occurred in the reservoir.

Thereafter, pressure differential warning devices, such as disclosed in U.S. Pat. No. 3,736,393 were introduced into brake systems of vehicles to monitor the fluid pressures supplied the wheel brakes. Such pressure differential warning devices are designed to activate a light on the dashboard of a vehicle whenever a predetermined pressure imbalance occurs between the hydraulic fluid pressures supplied the front and rear wheel brakes.

A light on the dashboard is usually connected to both the fluid level indicator and the pressure differential warning apparatus. Unfortunately, reed switches which are normally used in the fluid level indicators can stick and present a false fluid level signal to the warning light. In an effort to eliminate reed switches and their associated float actuators, it was suggested that the electrical capacitance of the fluid in the reservoir, which varies as a direct function of the volume of fluid in the reservoir be used to activate the light. However, it was discovered that the dielectric constant of currently available brake fluids vary with temperature, and produce false fluid level signals.

SUMMARY OF THE INVENTION

In an effort to prevent the development of false fluid level signals which inaccurately indicate a failed condition in a brake system, I have devised a tandem master cylinder having a shuttle piston which is responsive to a predetermined pressure imbalance to indicate a failure in the first hydraulic brake distribution system, in the second hydraulic brake distribution system, or a low fluid level in a reservoir.

The shuttle piston, which is located in a second bore in the master cylinder, includes a first spool and a second spool. The first spool is separated from the second spool to establish a fluid level responsive chamber in the second bore. The fluid level responsive chamber is connected to the reservoir of the master cylinder through a passageway. A float, which is located in the reservoir, is connected to a valve to control the communication of fluid into the fluid level responsive chamber. The float holds the valve against a seat when the fluid in the reservoir is above a predetermined level. In addition, the first and second hydraulic distribution systems are also connected to the second bore to communicate hydraulic fluid under pressure to the first and second spools, respectively. During normal operation of the master cylinder, the pressurized hydraulic fluid in the second hydraulic distribution system acts on the second spool and correspondingly pressurizes the fluid in the fluid level responsive chamber to oppose movement of the first spool by the pressurized hydraulic fluid acting on the first spool to thereby hold the first spool in a stationary position. As long as the first spool remain in a stationary position, an indicator switch remains in a deactivated state.

In a first mode of operation, if a low fluid condition occurs in the reservoir, the float moves the valve away from the seat to allow unrestricted communication between the reservoir and the fluid level responsive chamber. Thereafter, movement of the first spool by pressurized hydraulic fluid in the first distribution system is unopposed since any opposing hydraulic force generated by movement of the second spool by the pressurized hydraulic fluid in the second distribution system is vented to the reservoir. When the first spool moves, the indicator switch is actuated to provide the indicator with a signal indicating the existence of a dangerous low fluid condition in the reservoir of the master cylinder. When more fluid is added to the reservoir, the float reseats the valve and terminates the communication between the reservoir and the fluid level responsive chamber through the passageway. After several brake applications, the first spool is recentered in the bore and the indicator switch deactivated.

In a second mode of operation, if a failure should occur in either the first or second hydraulic fluid distribution systems, the pressurized fluid in the unfailed distribution system moves the first piston to operate the indicator switch and initiate the activation of the indicator to inform the operator of the existence of a hydraulic fluid failure condition in the brake system. When the failure condition is corrected in the fluid distribution system, the hydraulic pressures acting in the first and second spools recenter the first spool and deactivate the switch of the indicator.

It is another object of this invention to provide a master cylinder with an operational fluid indicator apparatus responsive to either a low fluid condition in a reservoir or a failure in a hydraulic fluid distribution system.

It is another object of this invention to provide an indicator with an actuation signal derived from separate first and second failure conditions in a brake system.

It is a further object of this invention to provide a master cylinder with fluid level indicator connected to a pressure differential warning switch in a fluid distribution system for informing an operator of the operational parameters of a brake system.

These and other objects will become apparent from reading the specification and viewing the drawings.

DETAILED DESCRIPTION OF THE DRAWINGS

Figures 1, 2, 3:
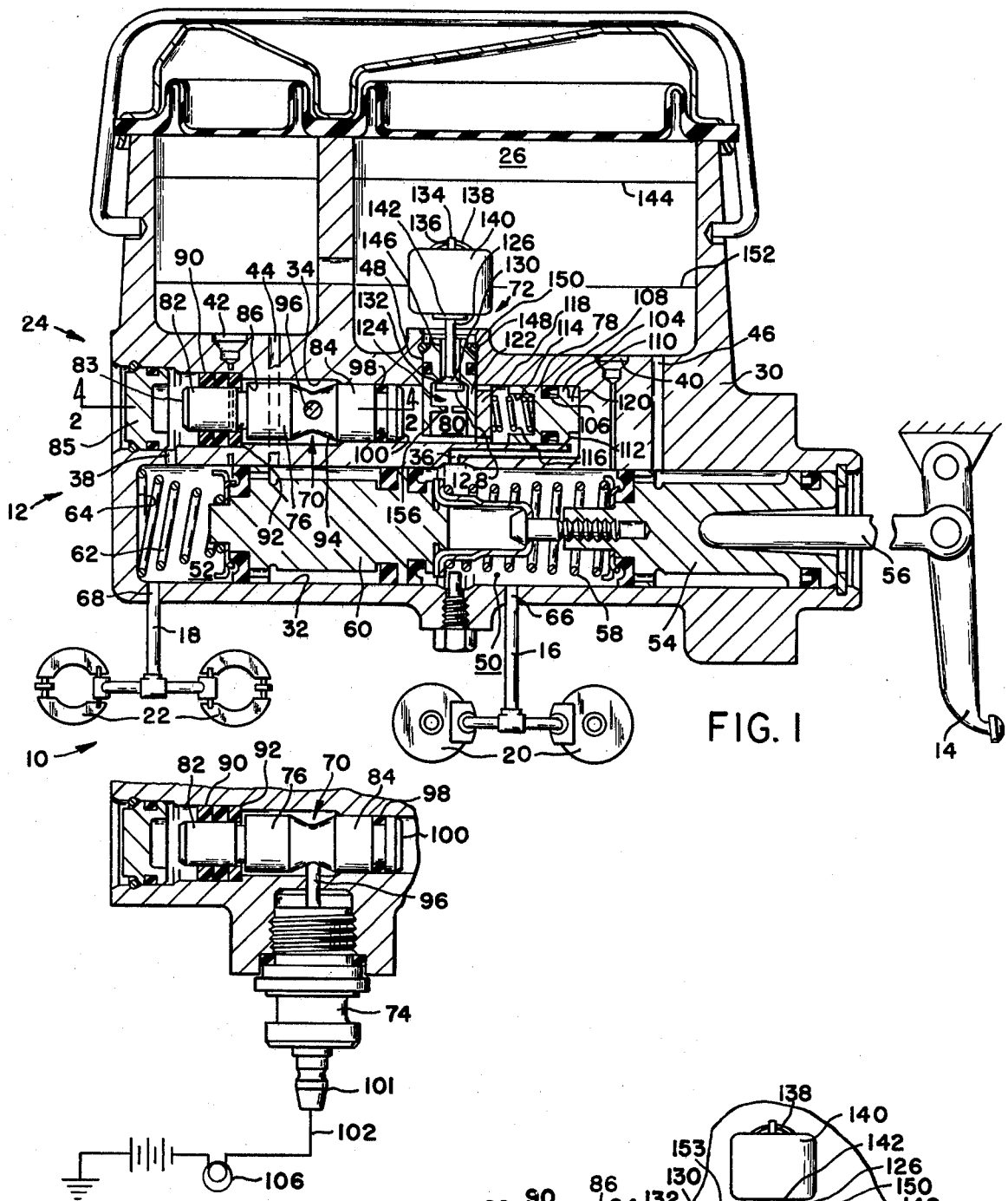
FIG. 1 is a schematic view of a brake system with a cross sectional view of a tandem master cylinder made according to the teachings of my invention.
FIG. 2 is a sectional view taken along lines 2—2 of FIG. 1.
FIG. 3 is a sectional view of a failure warning apparatus in the master cylinder of FIG. 1 in an activated position.

The brake system 10 shown in FIG. 1 includes a tandem master cylinder 12, brake pedal 14, and conduits 16 and 18 which communicate the master cylinder with the front brakes 20 and rear brakes 22, respectively. In response to an operator input force applied to brake pedal 14, hydraulic fluid is pressurized in the tandem master cylinder 12 and carried through conduits 16 and 18 to operate the front and rear brakes 20 and 22, respectively. The tandem master cylinder 12 has a failure indicating apparatus 24 which is responsive to the hydraulic pressure of the fluid in both conduits 16 and 18 and the fluid level in reservoir 26 to keep an operator informed of the hydraulic fluid operational parameters in the brake system 10.

In more particular detail, the tandem master cylinder 12 includes a housing 30 which has a first bore 32 and a second bore 34 located therein. A primary piston 54, which is attached to brake pedal 14 by push rod 56, is located in the first bore 32. A first spring 58 holds a secondary piston 60 away from the primary piston 54 to establish a first pressurizing chamber 50 in the first bore 32. A second spring 62 which holds the secondary piston 60 away from the bottom 64 of the first bore 32, establishes a second pressurizing chamber 52 in the first bore 32.

The first pressurizing chamber 50 is connected to the second bore 34 by a passageway 36 and to conduit 16 by outlet port 66. When the primary piston 54 is in the released position, as shown in FIG. 1, the first pressurizing chamber 50 is connected to reservoir 26 through compensator passage 40. In addition, the first bore 32 is also connected to reservoir 26 by relief passage 46 to prevent trapping of fluid on the back side of the primary piston 54 which could prevent movement of piston 54 to the released position shown in FIG. 1.

The second pressurizing chamber 52 is connected to the second bore 34 by a passageway 38 and to conduit 18 by outlet port 68. When the secondary piston 60 is in the released position, as shown in FIG. 1, the second pressurizing chamber 52 is connected to reservoir 26 through compensator passage 42. In addition, the first bore 32 is also connected to reservoir 26 by relief passage 44 which prevents the trapping of fluid on the back side of the secondary piston 60 which could prevent the release of piston 60 upon termination of input to piston 54.

The second bore 34 retains the failure indicator apparatus 24 which includes shuttle piston arrangement 70, fluid level responsive arrangement 72 and a failure warning switch 74, which is best shown in FIG. 2.

The shuttle piston arrangement 70 has a first spool 76 separated from a second spool 78 by a chamber 80 located in the second bore 34. The fluid level responsive chamber 80 is connected to reservoir 26 by passage 48.

The first spool 76 has a first diameter section 82 separated from a second diameter section 84 by a shoulder 86. A combination sleeve and seal member 90 which is located on the first diameter section 82 abuts shoulder or stop 92 on the housing 30. An actuation groove 94 which is located in second diameter section 84 of the spool 76 is aligned with pin 96, see FIG. 2, of the failure warning switch 74. A seal 98 is located adjacent the end 100 of the second diameter section 84 to prevent the communication of fluid from chamber 80 into the actuation groove section 94 on the first spool 76. The failure warning switch 74 is of a well known design and operates in a manner similar to the switch disclosed in U.S. Pat. No. 3,736,393. The terminal 101 of the failure warning switch 74 is connected to an electrical circuit 102 which actuates a light 106 or other indicator located on the dashboard of the vehicle.

The second spool 78 has a cylindrical member 104 with a groove 106 located therein for retaining a lip seal 108 which engages the second bore 34. A projection 110 extends from the face 112 of the cylindrical member 104. The cylindrical member 104 has a guide surface 114 for retaining a spring 116 in the second bore 34. Spring 116 engages retainer 118 to hold projection 110 against the bottom 120 of the second bore 34. Retainer 118 engages a tubular projection 122. The tubular projection 122 houses valve 124 of the fluid level responsive apparatus 72 to prevent the retainer 118 from contacting stem 126 which extends from the reservoir 26 through the tubular projection 122 and into chamber 80. The stem 126 has a first end 128 with a conical face 130 thereon which is matched with seat 132 in the tubular projection 122 to regulate the communication of fluid through passage 146. The stem 126 has a groove 136 adjacent end 134.

A retainer 138, which is located in groove 136, biases a float 140 toward shoulder 142 on stem 126. The float 140 engages retainer 138 and urges the stem 126 toward a predetermined fill line 144 to hold the conical face 130 of valve 124 against seat 132 and thereby prevent communication from reservoir 26 into chamber 80 through passage 146. A restriction 156 is located in the tubular projection 122 to control the rate of flow of fluid between the reservoir 26 and the chamber 80. A seal 153 prevents communication of fluid between the reservoir 26 and chamber around the outside of the tubular projection 122. A snap ring 148 which is located in groove 150 on housing 30, engages shoulder 154 to prevent the tubular projection 122 from being expelled from chamber 80 by a hyraulic fluid pressure.

MODE OF OPERATION OF THE INVENTION

The reservoir 26 in the master cylinder 12 is usually filled with hyraulic fluid up to fill line 144. During the process of air bleeding the brake lines, float 140 is depressed to allow fluid to completely fill the fluid level responsive chamber 80. Thereafter, the float 140 follows the level of the fluid in reservoir 26 and when the hydraulic fluid is above the low fluid level line 152, the float 140 holds conical face 130 of stem 126 against seat 132 to prevent communication of fluid between the reservoir 26 and chamber 80.

During a normal brake application, an operator applies an input force to pedal 14. Movement of the pedal 14 causes push rod 56 to simultaneously compress springs 58 and 62 to allow the primary piston 54 and secondary piston 60 to move past compensator passages 40 and 42 and develop identical primary and secondary hyraulic fluid pressures in the first and second pressurizing chambers 50 and 52. The primary hydraulic fluid pressure is communicated to the front brakes and the secondary hydraulic fluid pressure is communicated to the rear wheel brakes to complete a normal brake application.

The primary hydraulic fluid pressure, which is also communicated through passage 36 acts on spool 78 to compress spring 116 and create a fluid pressure in chamber 80. The fluid pressure in chamber 80 acts on end 128 of stem 126 to provide an auxiliary force with the float 140 to hold face 130 against seat 132 and prevent fluid communication through passage 146. This same fluid pressure acts on end 100 of spool 76 to oppose the movement of spool 76 by the force of the secondary hydraulic fluid acting on the first diameter 82 of spool 76.

When the input force from the operator ends, springs 58 and 62 return pistons 54 and 60 to the rest position and terminate the primary and secondary hydraulic pressures when chambers 50 and 52 are in communication with the reservoir 26 through compensator passages 40 and 42.

Should the fluid in reservoir 26 reach line 152, float 140 moves face 130 on stem 126 of valve 134 away from seat 132 as shown in FIG. 3 to allow free communication between reservoir 26 and the chamber 80 through passage 146. Thereafter, during a brake application, the primary hydraulic fluid acting on spool 78 moves fluid from chamber 80 into the reservoir 26 through passage 146 allowing the secondary hydraulic pressure to move spool 76 into engagement with the tubular projection 122. As spool 76 moves, pin 96 of the warning switch 74 follows the contour of groove 94 to the peripheral surface of the second diameter section 84 to turn ON the failure warning switch 74 and provide the operator with an indication of the existence of a dangerous operating condition in the brake system 10. Spool 76 remains against the tubular projection 122 after termination of the operational input force on pedal 14. Thereafter the switch 74 remains in the ON position to provide the operator with a warning of the dangerous condition of the brake system 10. However, the low fluid level condition does not hamper the development of the primary and secondary hydraulic fluid pressure and the operator may brake the vehicle until additional fluid is added to the reservoir. When chamber 50 is in communication with the reservoir 26 through passage 40 at the end of a brake application, spring 116 returns spool 78 to its rest position against stop 120. Spring 116 in returning spool 78 to the bottom of bore 34 draws fluid from the reservoir 26 into chamber 80 to maintain the fluid level therein in a full position. However, until such time as the fluid in the reservoir 26 is replenished, movement of spool 78 expels fluid from chamber 80 during each brake application. During a rapid brake application restricted orifice 156 prevents fluid pressure development in chamber 80 from closing passage 146 by acting on end 128 of the valve 124 and thereafter moving spool 76 to switch the warning switch to the OFF position. When the fluid in the reservoir 26 is filled to line 144, float 140 again moves face 130 against seat 132 to close valve 124 and prevent communication through passage 146. On the next brake application, the primary hydraulic fluid pressure acts on spool 78 and compresses spring 116 to develop a hydraulic fluid pressure in chamber 80. The hydraulic fluid pressure in chamber 80 acts on first end 100 of spool 76. The force created by the hydraulic fluid pressure acting on end 100 is greater than the secondary hydraulic fluid pressure acting on the first diameter 82, therefore, spool 76 moves away from stop or tubular projection 122 to allow pin 96 to be repositioned in groove 94. With pin 96 in groove 94, the warning switch 74 is switched to the OFF condition.

Should a failure occur in the distribution of the primary hydraulic fluid pressure to the front brakes or in the development of the primary hydraulic fluid pressure in the master cylinder 14, spring 116 holds projection 110 on spool 78 against the bottom of bore 120. Thus, the secondary hydraulic fluid pressure acts on the first diameter 82 of spool 76 and moves the first end 100 against the tubular projection 122. Movement of the spool 76 is not hampered by the fluid in chamber 80 since lip seal 108 allows fluid to flow into the primary chamber 50 by way of passage 36. As spool 76 moves toward the tubular projection 122, pin 96 follows the contour of groove 94 and actuates the failure warning switch 74 to inform the operator of the existence of a dangerous condition in the brake system 10. When the malfunction in the primary fluid distribution system is corrected, the force of the primary fluid acting on spool 78 creates a fluid pressure in chamber 80. The fluid pressure in chamber 80 acts on face 100 and overcomes the force of the secondary fluid pressure acting on diameter 82 to move spool 76 to a neutral position where pin 96 is located in groove 94. With pin 96 in groove 94, failure warning switch 74 is switched off.

Similarly, should a failure occur in the secondary hydraulic fluid distribution system to the rear brakes or in the development of the secondary hydraulic fluid pressure in the master cylinder 12, the primary hydraulic fluid pressure developed in chamber 50 acts on face 112 of spool 78 and overcomes spring 116 to develop a hydraulic fluid pressure in chamber 80. This fluid pressure acts on valve 124 to seal passage 146 and on face 100 of spool 76. Since there is no secondary hydraulic fluid pressure to act on face 83, the fluid pressure in chamber 80 moves spool 76 until face 83 engages plug 85 in housing 30. As spool 76 moves, pin 96 follows the contour of groove 94 to switch the failure warning switch 74 ON. The failure warning switch 74 remains ON until the condition in the secondary distribution system is corrected.

When the failure condition in the secondary distribution system is corrected, the secondary fluid pressure acts on the combination sleeve and seal 90 and first diameter 82 to overcome the force of the fluid pressure acting on face 100 to move spool 76 toward the fluid level responsive chamber 80 until the combination sleeve and seal 90 engage shoulder 92. When the combination sleeve and seal 90 engage shoulder 92, pin 96 is located in groove 94 to deactivate the failure warning switch 74.

Thus, the failure indicator apparatus 24 responds to either a failure in the distribution system of the master cylinder 12 or a low fluid level condition in the master cylinder to provide an operator with an indication of the existence of a dangerous hydraulic fluid condition in the brake system 10.

Figure 4:
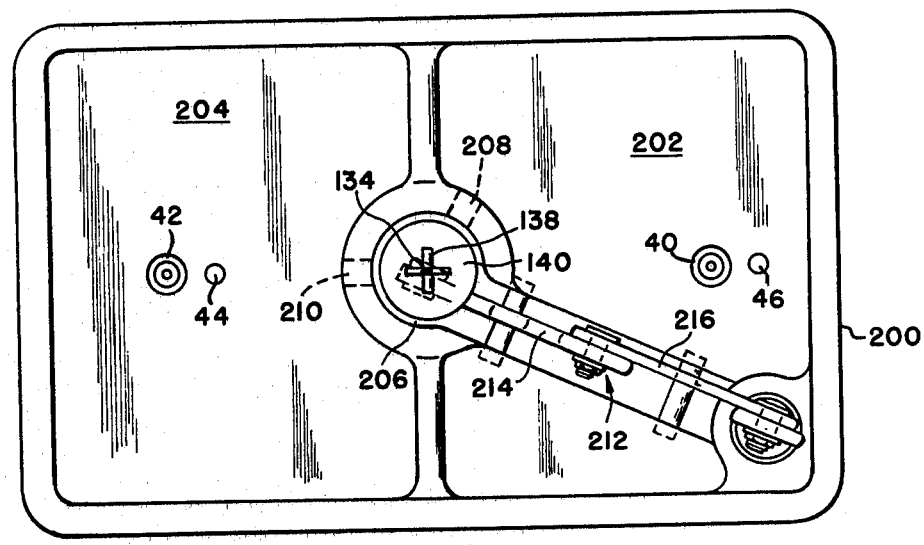
FIG. 4 is a top view of a tandem master cylinder showing a fluid level responsive member located in the axial center of a reservoir.
Figure 5:
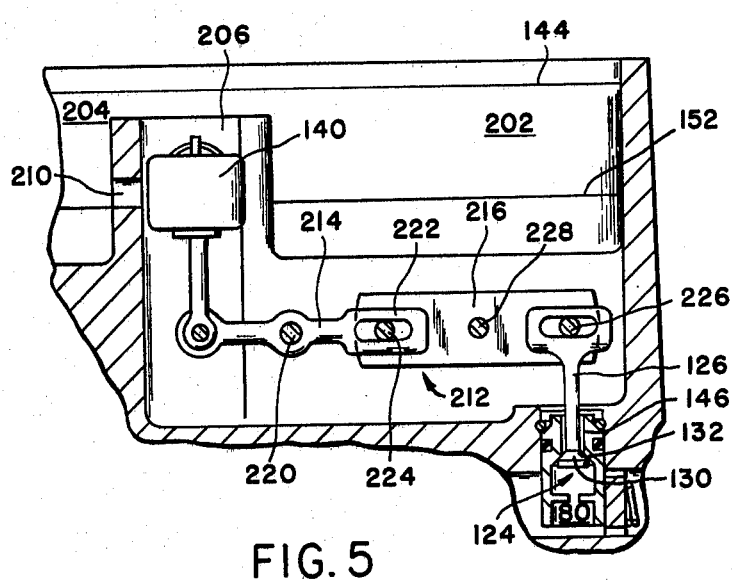
FIG. 5 is a sectional view taken along lines 5—5 of FIG. 4.

In the master cylinder reservoir 200 shown in FIG. 4, the interior is divided into a first compartment 202 and a second compartment 204 similar to that disclosed in U.S. Pat. No. 3,879,947. The float 140 is located in well 206 at the center of gravity of the interior of the reservoir 200. Passages 208 and 210 connect the first and second compartments 202 and 204 with the well 206. A lever arrangement 212 which has a first arm 214 and a second arm 216 connects the float 140 to stem 126 of the valve 124, as shown in FIG. 5. The float 140 provides the valve 124 with a fluid level signal. Placing the float 140 at the center of gravity reduces the possibility of the introduction of a false fluid level signal into the operation of the indicator means 24. When the fluid in reservoir sections 202 and 204 is at the fill line 144, float 140 causes lever arm 214 to pivot on pin 220 and imparts clockwise movement to end 222. End 222 in turn acts through pin 224 to impart a counterclockwise movement to end 226 by rotating around pin 228 to hold face 130 against seat 132 and prevent fluid communication from well 206 into the fluid level responsive chamber 8 through passage 146. As with the embodiment in FIG. 1, should the fluid level in the reservoir reach line 152, float 140 causes stem 126 to move face 130 away from seat 132 and allow the activation of switch 74 through movement of shuttle piston 70.

I claim:

1. A master cylinder comprising:

a housing having a reservoir connected to a first bore and second bore located therein, said first bore being connected to said second bore;

fluid level responsive means for controlling the communication of fluid between said reservoir and second bore, said fluid level responsive means including a fleat, a stem and a valve, said float being located in said reservoir, said stem extending from said float into said second bore, said valve being attached to said stem and located in said second bore, said float holding said valve against a seat when the fluid in said reservoir is above a predetermined level;

a first operational piston located in said first bore;

a second operational piston located in said first bore, said first and second operational pistons defining a first power chamber therebetween and a second power chamber between said second operational piston and a closed wall of said first bore, said first and second operational pistons initially responding to an input force for interrupting communication of fluid beween said reservoir and said first and second power chambers and thereafter pressurizing the fluid in the first and second power chambers to produce first and second fluid output signals which are communicated to said second bore;

shuttle piston means including a first spool, a sleeve and a second spool located in said second bore, said first spool having a first diameter separated from a second diameter by a shoulder, said first spool having a groove located in said second diameter, said sleeve surrounding said first diameter of said first spool, said first fluid output signal acting on said sleeve and said first diameter of the spool to position said groove adjacent a switch means, said second spool being separated from said first spool to establish a fluid actuation chamber in said second bore, said valve of the fluid level responsive means being located in said fluid actuation chamber, said float holding said valve means against its seat to allow said second fluid output signal to act on the second spool and pressurize fluid in said actuation chamber to maintain the first spool in stationary position; and said switch means being responsive to movement of said shuttle piston means for informing an operator of a fluid condition resulting from a pressure differential across said shuttle piston means, said pressure differential occurring in a first condition whenever a predetermined fluid level in said reservoir moves said fluid level responsive means and permits fluid communication between the second bore and said reservoir and in a second condition whenever a differential pressure exists across the second operational piston.

2. The master cylinder, as recited in claim 31, wherein said fluid level responsive means includes:

a lever located between said float and said stem for locating said float in the approximate center of said reservoir to reduce the creation of a false low fluid level signal caused through the rotation of said housing about a horizontal plane.

3. The master cylinder, as recited in claim 2, wherein said housing includes:

orifice means located in a conduit connecting the second bore and said reservoir for restricting the communication of fluid from the second bore into the reservoir to prevent closure of said valve by the presentation of said first and second fluid output signals to said shuttle piston.

4. The master cylinder, as recited in claim 1, wherein said fluid level responsive means further includes:

stop means for limiing the movement of said first and second spools toward each other when a pressure differential across said shuttle piston means occurs 5. The master cylinder, as recited in claim 4, wherein said second spool means includes:

a spring connected to said stop means for holding said second spool at a rest position in the absence of a second fluid output signal.

* * * * *